US012286349B1

United States Patent
Abdulkhair et al.

(10) Patent No.: US 12,286,349 B1
(45) Date of Patent: Apr. 29, 2025

(54) SYNTHESIS OF NANOCOMPOSITE FOR GREEN ENERGY PRODUCTION

(71) Applicant: Imam Mohammad Ibn Saud Islamic University, Riyadh (SA)

(72) Inventors: Babiker Yagoub Elhadi Abdulkhair, Riyadh (SA); Mohamed Nady Abd El-Hameed Ibrahim, Riyadh (SA); Mohamed Khairy Abdel-Fatah Omran, Riyadh (SA)

(73) Assignee: Imam Mohammad Ibn Saud Islamic University, Riyadh (SA)

( * ) Notice: Subject to any disclaimer, the term of this patent is extended or adjusted under 35 U.S.C. 154(b) by 0 days.

(21) Appl. No.: 18/985,178

(22) Filed: Dec. 18, 2024

(51) Int. Cl.
*C01B 3/04* (2006.01)
*B01J 23/28* (2006.01)
(Continued)

(52) U.S. Cl.
CPC .............. *C01B 3/04* (2013.01); *B01J 23/28* (2013.01); *B01J 37/0036* (2013.01); *B01J 37/08* (2013.01);
(Continued)

(58) Field of Classification Search
CPC ........ B01J 23/28; B01J 37/0036; B01J 37/08; C01B 3/04; C01B 2203/1041; C01B 2203/1647
(Continued)

(56) References Cited

U.S. PATENT DOCUMENTS 2,692,293 A * 10/1954 Heinemann ............ C07C 4/18
502/306
2010/0178240 A1* 7/2010 Capron ................. H01M 8/065
977/773

FOREIGN PATENT DOCUMENTS

CN  102824913 B  8/2014
CN  109289846 B  3/2021
(Continued)

OTHER PUBLICATIONS

Rasmiah S. Almufarij et al., "Fast-simplistic fabrication of MoO3@Al2O3—MgO triple nanocomposites for efficient elimination of pharmaceutical contaminants." Results in Chemistry 7, pp. 1-11. (Year: 2024).*
N
(Continued)

*Primary Examiner* — Patricia L. Hailey
(74) *Attorney, Agent, or Firm* — Oblon, McClelland, Maier & Neustadt, L.L.P.

(57) ABSTRACT

A method for synthesizing a $MoO_3@Al_2O_3$—MgO nanocomposite material incudes adding distilled water and ammonium molybdate to a powder mixture of $Al(NO_3)_3 \cdot 9H_2O$, $Mg(Ac)_2 \cdot 4H_2O$, and sucrose to form a reaction mixture and heating the reaction mixture to a reaction temperature in a range of 150° C. to 220° C. to form a carbonized product. The method further includes grinding the carbonized product to form a ground carbonized product and calcining the ground carbonized product at a temperature of about 700° C. to 800° C. for a period of 2 to 4 hours to form the $MoO_3@Al_2O_3$—MgO nanocomposite material. The $MoO_3$ content of the $MoO_3@Al_2O_3$—MgO nanocomposite material ranges from 1 wt. % to 20 wt. % and the $MoO_3@Al_2O_3$—MgO nanocomposite material has a hydrogen generation rate of greater than or equal to 400 $mL \cdot min^{-1} \cdot g^{-1}$, when used to generate hydrogen from $NaBH_4$.

20 Claims, 7 Drawing Sheets

(51) Int. Cl.
   *B01J 37/00*   (2006.01)
   *B01J 37/08*   (2006.01)

(52) U.S. Cl.
   CPC .............. *C01B 2203/1041* (2013.01); *C01B 2203/1647* (2013.01)

(58) Field of Classification Search
   USPC .............. 502/306, 322, 415; 423/648.1; 252/188.25
   See application file for complete search history.

(56) References Cited

FOREIGN PATENT DOCUMENTS

| CN | 110252356 | | 4/2022 | | |
| CN | 118022811 | A | 5/2024 | | |
| JP | 2002153760 | A * | 5/2002 | ............. | B01D 53/86 |
| WO | WO-2007001164 | A1 * | 1/2007 | ............. | B01J 23/745 |
| WO | 2008093286 | A2 | 8/2008 | | |

OTHER PUBLICATIONS

Minghong Huang et al., "Hydrogen production via hydrolysis of Mg-oxide composites." International Journal of Hydrogen Energy 42, pp. 22305-22311. (Year: 2017).*

Fahad Abdulaziz, et al., "Investigating the potential of ZrO2/MoO3 nanocomposites for efficient hydrogen generation through NaBH4 methanolysis", Ceramics International, vol. 50, Issue 16, Aug. 15, 2024, 28016-28024, 6 pages.

Chenxi Shang, et al., "Interface engineering of Co2B—MoO3/MOF heterojunctions with rich cobalt defects for highly enhanced NaBH4 hydrolysis", Inorganic Chemistry Frontiers, vol. 11, Issue 20, 2024, 7142-7151, 2 pages, Abstract only.

* cited by examiner

SYNTHESIS OF NANOCOMPOSITE FOR GREEN ENERGY PRODUCTION

BACKGROUND

Technical Field

The present disclosure is directed toward green energy production methods, and more particularly, relates to a method of synthesizing a nanocomposite material for green energy generation and storage.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The rapid industrialization and population growth in recent decades have increased global energy demand, highlighting the need for alternative energy sources. The depletion of non-renewable resources, coupled with rising environmental concerns such as climate change and pollution, emphasizes the urgency of transitioning to clean, renewable energy solutions. One such renewable energy source is solar energy, which is inexpensive to generate, however, solar energy generation faces challenges in storage due to the reliance on costly and difficult-to-dispose battery-based storage systems. In contrast, hydrogen may be considered a desirable alternative, offering the potential to reduce dependency on fossil fuels and lower environmental impacts, particularly when used in fuel cells that emit water vapor only. Hydrogen energy offers several advantages such as cleaner energy generation process, ease of storage due to compressible nature of hydrogen and complete elimination of battery needs. Further, hydrogen energy offers several advantages over traditional battery systems as it has a higher energy density, allowing it to store more energy in a smaller volume, which may be beneficial for applications like transportation where space and weight should be optimized. Hydrogen-powered vehicles may be refueled in a shorter time period, similar to gasoline vehicles, whereas electric vehicles require much longer charging times. Hydrogen fuel cells also provide longer operational ranges compared to battery electric vehicles, making them suitable for heavy-duty and long-distance applications. Despite these benefits, large-scale hydrogen production faces challenges such as use of energy-intensive methods and complexities in storage and transportation of hydrogen, which must be addressed for hydrogen to become a viable mainstream energy solution.

Nanocomposites, particularly metal oxide-based materials, are highly suitable for hydrogen production due to their desirable catalytic properties, including high surface area, tunable porosity, and improved electron conductivity. The aforementioned properties enable efficient hydrogen generation, making hydrogen production a promising solution for large-scale energy storage from renewable sources like solar and wind power. However, the synthesis of nanocomposites for hydrogen generation involves high temperatures and long processing times, often leading to irregular particle sizes and inconsistent porosity, which may negatively affect the performance of the process. Many current synthesis techniques contribute to high operational costs and material inefficiency, with extensive milling and post-treatment steps required for non-uniform particle size distribution. Hence, in order to achieve an efficient nanocomposite material, issues related to production costs, infrastructure, and energy conversion efficiency must be addressed.

Accordingly, one object of the present disclosure is to provide an efficient method for hydrogen generation using a nanocomposite catalyst that may circumvent the drawbacks and limitations such as high cost, high lead times, low efficiency, and poor environmental performance of methods and materials known in the art.

SUMMARY

In an exemplary embodiment, a method for synthesizing a $MoO_3@Al_2O_3$—MgO nanocomposite material is described. The method includes adding distilled water and nitric acid ($HNO_3$) to a mixture of $(NH_4)_2MoO_4$, $Al(NO_3)_3 \cdot 9H_2O$, $Mg(Ac)_2 \cdot 4H_2O$, and sucrose to form a reaction mixture and heating the reaction mixture to a reaction temperature ranging from 150° C. to 220° C. until a carbonized product is formed. The method further includes grinding the carbonized product to form a ground carbonized product and calcining the ground carbonized product at a temperature in a range of 700° C. to 800° C. for a period of 2 to 4 hours to form the $MoO_3@Al_2O_3$—MgO nanocomposite material. The $MoO_3$ content of the $MoO_3@Al_2O_3$—MgO nanocomposite material ranges from 1 percent by weight (wt. %) to 20 wt. % of the total weight of the $MoO_3@Al_2O_3$—MgO nanocomposite material and the $MoO_3@Al_2O_3$—MgO nanocomposite material has a hydrogen generation rate of greater than or equal to 400 milliliter per minute per gram ($mL \cdot min^{-1} \cdot g^{-1}$) when used to generate hydrogen from $NaBH_4$.

In some embodiments, the $MoO_3$ content of the $MoO_3@Al_2O_3$—MgO nanocomposite material is in a range from 5 wt. % to 15 wt. % of the total weight of the $MoO_3@Al_2O_3$—MgO nanocomposite material.

In some embodiments, the $MoO_3$ content of the $MoO_3@Al_2O_3$—MgO nanocomposite material is in a range from 8 wt. % to 12 wt. % of the total weight of the $MoO_3@Al_2O_3$—MgO nanocomposite material.

In some embodiments, the $MoO_3$ content of the $MoO_3@Al_2O_3$—MgO nanocomposite material is 10 wt. % of the total weight of the $MoO_3@Al_2O_3$—MgO nanocomposite material.

In some embodiments, the $MoO_3@Al_2O_3$—MgO nanocomposite material has a hydrogen generation rate of greater than or equal to 500 $mL \cdot min^{-1} \cdot g^{-1}$ when used to generate hydrogen from $NaBH_4$ at a temperature of 30° C.

In some embodiments, the $MoO_3@Al_2O_3$—MgO nanocomposite material has a hydrogen generation rate of greater than or equal to 550 $mL \cdot min^{-1} \cdot g^{-1}$ when used to generate hydrogen from $NaBH_4$ at a temperature of 30° C.

In some embodiments, the $MoO_3@Al_2O_3$—MgO nanocomposite material has a hydrogen generation rate of greater than or equal to 600 $mL \cdot min^{-1} \cdot g^{-1}$ when used to generate hydrogen from $NaBH_4$ at a temperature of 35° C.

In some embodiments, the $MoO_3@Al_2O_3$—MgO nanocomposite material has a hydrogen generation rate of greater than or equal to 800 $mL \cdot min^{-1} \cdot g^{-1}$ when used to generate hydrogen from $NaBH_4$ at a temperature of 40° C.

In some embodiments, the $MoO_3@Al_2O_3$—MgO nanocomposite material has a hydrogen generation rate of greater than or equal to 1000 $mL \cdot min^{-1} \cdot g^{-1}$ when used to generate hydrogen from $NaBH_4$ at a temperature of 45° C.

In some embodiments, the $MoO_3@Al_2O_3$—MgO nanocomposite material has a hydrogen generation rate of greater than or equal to 1200 mL·min$^{-1}$·g$^{-1}$ when used to generate hydrogen from NaBH$_4$ at a temperature of 45° C.

In another exemplary embodiment, a method of hydrogen generation from NaBH$_4$ is described. The method includes hydrolyzing NaBH$_4$ in the presence of a MoO$_3$@Al$_2$O$_3$—MgO nanocomposite. The NaBH$_4$ is hydrolyzed to evolve H$_2$ gas and the MoO$_3$@Al$_2$O$_3$—MgO nanocomposite material catalyzes the hydrolysis. The method further includes collecting the H$_2$ gas. The MoO$_3$ content of the MoO$_3$@Al$_2$O$_3$—MgO nanocomposite material ranges from 1 wt. % to 20 wt. % of the total weight of the MoO$_3$@Al$_2$O$_3$—MgO nanocomposite material. The hydrogen generation rate is greater than or equal to 400 mL·min$^{-1}$·g$^{-1}$.

In some embodiments, the MoO$_3$ content of the MoO$_3$@Al$_2$O$_3$—MgO nanocomposite material is in a range from 5 wt. % to 15 wt. % of the total weight of the MoO$_3$@Al$_2$O$_3$—MgO nanocomposite material.

In some embodiments, the MoO$_3$ content of the MoO$_3$@Al$_2$O$_3$—MgO nanocomposite material is in a range from 8 wt. % to 12 wt. % of the total weight of the MoO$_3$@Al$_2$O$_3$—MgO nanocomposite material.

In some embodiments, the MoO$_3$ content of the MoO$_3$@Al$_2$O$_3$—MgO nanocomposite material is 10 wt. % of the total weight of the MoO$_3$@Al$_2$O$_3$—MgO nanocomposite material.

In some embodiments, the hydrogen generation rate is greater than or equal to 500 mL·min$^{-1}$·g$^{-1}$ at a reaction temperature of 30° C.

In some embodiments, the hydrogen generation rate is greater than or equal to 550 mL·min$^{-1}$·g$^{-1}$ at a reaction temperature of 30° C.

In some embodiments, the hydrogen generation rate is greater than or equal to 600 mL·min$^{-1}$·g$^{-1}$ at a reaction temperature of 35° C.

In some embodiments, the hydrogen generation rate is greater than or equal to 800 mL·min$^{-1}$·g$^{-1}$ at a reaction temperature of 40° C.

In some embodiments, the hydrogen generation rate is greater than or equal to 1000 mL·min$^{-1}$·g$^{-1}$ at a reaction temperature of 45° C.

In some embodiments, the hydrogen generation rate is greater than or equal to 1200 mL·min$^{-1}$·g$^{-1}$ at a reaction temperature of 45° C.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Furthermore, the terms "approximately," "approximate," "about," and similar terms generally refer to ranges that include the identified value within a margin of 20%, 10%, or preferably 5%, and any values therebetween.

Aspects of the present disclosure are directed toward a catalyst system designed to enhance the hydrolysis of sodium borohydride (NaBH$_4$) for efficient hydrogen generation. It utilizes a solid catalyst composed of low-cost materials, which is easy to prepare and offers a high hydrogen generation rate (HGR) in a short time. This catalyst system facilitates the safe and rapid release of hydrogen from NaBH$_4$, making it an efficient solution for clean hydrogen production. The present disclosure circumvents the drawbacks of prior art by addressing limitations such as high catalyst costs, slow reaction rates, and environmental concerns. Traditional catalysts often require expensive materials and result in inefficient or slow hydrogen production. In contrast, the present disclosure uses a cost-effective catalyst that promotes faster hydrogen generation without relying on toxic or scarce materials. The simplicity of its preparation and its high catalytic activity also enable scalability and practical applicability, making it a more efficient and sustainable alternative to existing methods.

Figure 1A:
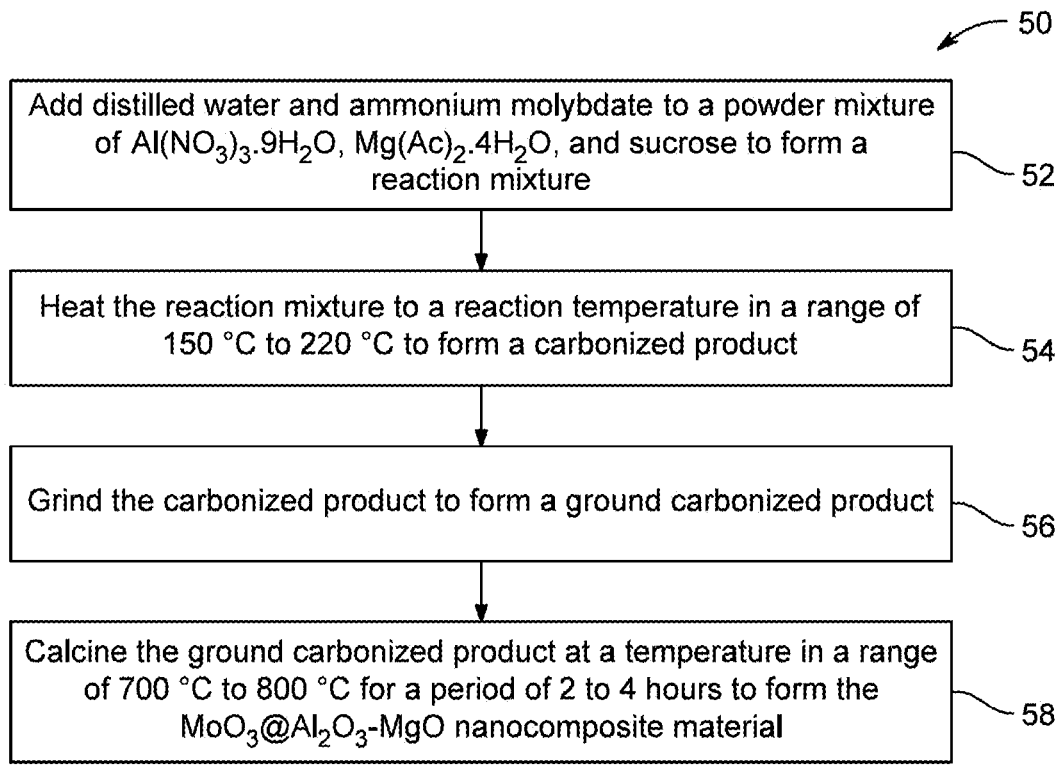
FIG. 1A is a flow chart depicting a method for synthesizing a MoO$_3$@Al$_2$O$_3$—MgO nanocomposite material, according to certain embodiments.

FIG. 1A illustrates a flow chart of a method 50 for synthesizing a MoO$_3$@Al$_2$O$_3$—MgO nanocomposite material. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes adding distilled water and ammonium molybdate to a powder mixture of $Al(NO_3)_3 \cdot 9H_2O$, $Mg(Ac)_2 \cdot 4H_2O$, and sucrose to form a reaction mixture. The $Al(NO_3)_3 \cdot 9H_2O$ provides the $Al_3+$ ions needed to form $Al_2O_3$; the $Mg(Ac)_2 \cdot 4H_2O$ supplies the $Mg^{2+}$ ions, $(NH_4)_2MoO_4$ provides the molybdenum oxide precursor. The sucrose acts as a carbon source to potentially aid in creating a porous structure. The sucrose acts as a carbon source to potentially aid in creating a porous structure. In some embodiments, glucose, citric acid, glycerol, tannic acid, polyvinyl alcohol (PVA), humic acid may also be used in place of sucrose to serve as the carbon source.

In some embodiments, the sucrose is present in the reaction mixture in a range from 0.1 to 1 M, more preferably 0.45 to 0.65 M, and yet more preferably about 0.584 M. In some embodiments, the concentration of $(NH_4)_2MoO_4$ in the reaction mixture in a range from 0.1 to 1.0 M, preferably about 0.2 to 0.5 M. In some embodiments, the concentration of $Al(NO_3)_3 \cdot 9H_2O$ present in the reaction mixture is in a range from 0.5 to 1.5 M, more preferably 0.9 to 0.95 M, and yet more preferably 0.930 M. In some embodiments, the concentration of $Mg(Ac)_2 \cdot 4H_2O$ in the reaction mixture is in the range from 2.0 to 2.7 M, more preferably 2.2 to 2.5 M, and yet more preferably 2.36 M.

At step 54, the method 50 includes heating the reaction mixture to a reaction temperature in a range of 150 to 220° C. to form a carbonized product. In some embodiments, heating of the reaction mixture can be performed by using heating appliances such as ovens, microwaves, autoclaves, hot plates, heating mantles and tapes, oil baths, salt baths, sand baths, air baths, hot-tube furnaces, and hot-air guns. The heating is varied out till all the water is evaporated, and causes degradation of the carbon source, preferably sucrose.

At step 56, the method 50 includes grinding the carbonized product to form a ground carbonized product. The grinding may be carried out using any suitable means, for example, ball milling, blending, etc., using manual method (e.g., mortar) or machine-assisted methods such as using a mechanical blender, or any other apparatus known to those of ordinary skill in the art. In a preferred embodiment, the carbonized product is ground in a motor to obtain the ground carbonized product.

At step 58, the method 50 includes calcining the ground carbonized product at a temperature in a range from 700 to 800° C., more preferably 720 to 780° C., more preferably 750° C. for a period of 2 to 4 hours, 2.5 to 3.5 hours, and yet more preferably 3 hours to form the $MoO_3@Al_2O_3$—MgO nanocomposite material. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min. During calcination, any carbon source material left further decomposes, leaving behind a porous structure, and the metal salts convert to oxides, forming the $MoO_3@Al_2O_3$—MgO nanocomposite material.

In some embodiments, the $MoO_3$ content of the $MoO_3@Al_2O_3$—MgO nanocomposite material is in a range from 1 to 20 wt. %, preferably 5 to 15 wt. %, preferably 8 to 12 wt. %, and yet more preferably 10 wt. % of the total weight of the $MoO_3@Al_2O_3$—MgO nanocomposite material.

In some embodiments, the $MoO_3@Al_2O_3$—MgO nanocomposite material has a hydrogen generation rate of greater than or equal to 400 milliliters per minute per gram ($mL \cdot min^{-1} \cdot g^{-1}$) when used to generate hydrogen from $NaBH_4$ as described below. In some embodiments, the $MoO_3@Al_2O_3$—MgO nanocomposite material has a hydrogen generation rate of greater than or equal to 500 $mL \cdot min^{-1} \cdot g^{-1}$, preferably 510 $mL \cdot min^{-1} \cdot g^{-1}$, preferably 520 $mL \cdot min^{-1} \cdot g^{-1}$, preferably 530 $mL \cdot min^{-1} \cdot g^{-1}$, preferably 540 $mL \cdot min^{-1} \cdot g^{-1}$, preferably 550 $mL \cdot min^{-1} \cdot g^{-1}$, preferably 560 $mL \cdot min^{-1} \cdot g^{-1}$, preferably 570 $mL \cdot min^{-1} \cdot g^{-1}$, and yet more preferably 580 $mL \cdot min^{-1} \cdot g^{-1}$ when used to generate hydrogen from $NaBH_4$ at a temperature of 30° C. In some embodiments, the $MoO_3@Al_2O_3$—MgO nanocomposite material has a hydrogen generation rate of greater than or equal to 550 $mL \cdot min^{-1} \cdot g^{-1}$ when used to generate hydrogen from $NaBH_4$ at a temperature of 30° C.

In some embodiments, the $MoO_3@Al_2O_3$—MgO nanocomposite material has a hydrogen generation rate of greater than or equal to 600 $mL \cdot min^{-1} \cdot g^{-1}$, preferably 610 $mL \cdot min^{-1} \cdot g^{-1}$, preferably 620 $mL \cdot min^{-1} \cdot g^{-1}$, and yet more preferably 630 $mL \cdot min^{-1} \cdot g^{-1}$ when used to generate hydrogen from $NaBH_4$ at a temperature of 35° C. as described below.

In some embodiments, the $MoO_3@Al_2O_3$—MgO nanocomposite material has a hydrogen generation rate of greater than or equal to 800 $mL \cdot min^{-1} \cdot g^{-1}$, preferably 810 $mL \cdot min^{-1} \cdot g^{-1}$, preferably 820 $mL \cdot min^{-1} \cdot g^{-1}$, preferably 830 $mL \cdot min^{-1} \cdot g^{-1}$, preferably 840 $mL \cdot min^{-1} \cdot g^{-1}$, preferably 850 $mL \cdot min^{-1} \cdot g^{-1}$, preferably 860 $mL \cdot min^{-1} \cdot g^{-1}$, preferably 870 $mL \cdot min^{-1} \cdot g^{-1}$, and preferably 880 $mL \cdot min^{-1} \cdot g^{-1}$, preferably 890 $mL \cdot min^{-1} \cdot g^{-1}$, preferably 900 $mL \cdot min^{-1} \cdot g^{-1}$, preferably 910 $mL \cdot min^{-1} \cdot g^{-1}$, preferably 920 $mL \cdot min^{-1} \cdot g^{-1}$, preferably 930 $mL \cdot min^{-1} \cdot g^{-1}$, and yet more preferably 940 $mL \cdot min^{-1} \cdot g^{-1}$, when used to generate hydrogen from $NaBH_4$ at a temperature of 40° C. as described below.

In some embodiments, the $MoO_3@Al_2O_3$—MgO nanocomposite material has a hydrogen generation rate of greater than or equal to 1000 $mL \cdot min^{-1} \cdot g^{-1}$ when used to generate hydrogen from $NaBH_4$ at a temperature of 45° C. as described below. In some embodiments, the $MoO_3@Al_2O_3$—MgO nanocomposite material has a hydrogen generation rate of greater than or equal to 1200 $mL \cdot min^{-1} \cdot g^{-1}$, preferably 1210 $mL \cdot min^{-1} \cdot g^{-1}$, preferably 1220 $mL \cdot min^{-1} \cdot g^{-1}$, preferably 1230 $mL \cdot min^{-1} \cdot g^{-1}$, preferably 1240 $mL \cdot min^{-1} \cdot g^{-1}$, preferably 1250 $mL \cdot min^{-1} \cdot g^{-1}$, preferably 1260 $mL \cdot min^{-1} \cdot g^{-1}$, preferably 1270 $mL \cdot min^{-1} \cdot g^{-1}$, and preferably 1280 $mL \cdot min^{-1} \cdot g^{-1}$, preferably 1290 $mL \cdot min^{-1} \cdot g^{-1}$, preferably 1300 $mL \cdot min^{-1} \cdot g^{-1}$, preferably 1310 $mL \cdot min^{-1} \cdot g^{-1}$, preferably 1320 $mL \cdot min^{-1} \cdot g^{-1}$, preferably 1330 $mL \cdot min^{-1} \cdot g^{-1}$, preferably 1340 $mL \cdot min^{-1} \cdot g^{-1}$, preferably 1350 $mL \cdot min^{-1} \cdot g^{-1}$, preferably 1360 $mL \cdot min^{-1} \cdot g^{-1}$, preferably 1370 $mL \cdot min^{-1} \cdot g^{-1}$, preferably 1380 $mL \cdot min^{-1} \cdot g^{-1}$, preferably 1390 $mL \cdot min^{-1} \cdot g^{-1}$, and yet more preferably 1400 $mL \cdot min^{-1} \cdot g^{-1}$ when used to generate hydrogen from $NaBH_4$ at a temperature of 45° C.

Figure 1B:
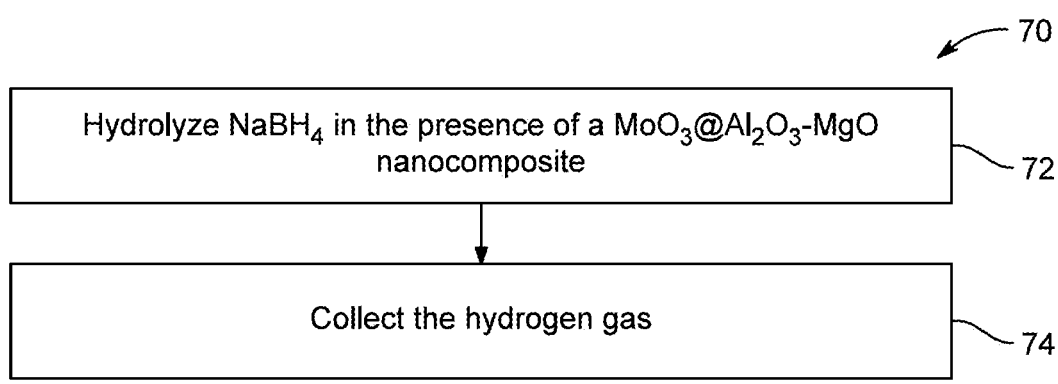
FIG. 1B is a flow chart of a method of hydrogen generation from NaBH$_4$, according to certain embodiments.

FIG. 1B illustrates a flow chart of a method 70 of hydrogen generation from $NaBH_4$. Hydrogen generation from sodium borohydride ($NaBH_4$) refers to the process in which $NaBH_4$ reacts with water (or other suitable reactants) to release hydrogen gas ($H_2$). This chemical reaction is often referred to as hydrolysis. In the presence of a catalyst, $NaBH_4$ undergoes hydrolysis, breaking down into sodium metaborate ($NaBO_2$) and hydrogen gas. The general reaction is:

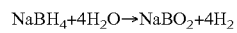

This reaction provides a way to generate hydrogen efficiently, with sodium borohydride being a high-density hydrogen carrier. The hydrogen gas produced can be used in fuel cells or other applications that require clean, on-demand hydrogen generation. The process is particularly attractive due to $NaBH_4$'s high hydrogen content and the fact that the byproducts (such as sodium metaborate) are relatively benign compared to those from fossil fuel-based methods. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes hydrolyzing $NaBH_4$ in the presence of a $MoO_3@Al_2O_3$—MgO nanocomposite. The $NaBH_4$ is hydrolyzed to evolve $H_2$ gas in the presence of the $003@Al_2O_3$—MgO nanocomposite material. $MoO_3$ of the $MoO_3@Al_2O_3$—MgO nanocomposite material is effective in promoting the hydrolysis of $NaBH_4$ by lowering the activation energy of the reaction. $Al_2O_3$ and MgO when combined with $MoO_3$, form a nanocomposite that enhances the overall catalytic activity and durability. The $MoO_3@Al_2O_3$—MgO nanocomposite is a composite material where $MoO_3$ is anchored onto the surface or dispersed into a $Al_2O_3$ and MgO matrix, forming a hybrid catalyst. The design improves the interaction between the catalyst and the $NaBH_4$, providing more active sites for the reaction to take place. In the presence of the $MoO_3@Al_2O_3$—MgO nanocomposite material, the hydrolysis process becomes faster, more efficient, and can operate under milder conditions (e.g., lower temperatures or pressures), which is beneficial for hydrogen production systems.

At step 74, the method 70 includes collecting the $H_2$ gas. In some embodiments, methods for collecting hydrogen may include, but are not limited to, water displacement, gas collection bags, pressure collection in cylinders or tanks, cold trap collection, siphon collection, absorption into metal hydrides, membrane separation, and cryogenic collection. Any other applicable system of hydrogen collection may be used. Also, any typical method of hydrogen storage may be employed after the method to store hydrogen safely.

In some embodiments, the $MoO_3$ content of the $MoO_3@Al_2O_3$—MgO nanocomposite material is in a range from 1 to 20 wt. %, preferably 5 to 15 wt. %, preferably 8 to 12 wt. %, and yet more preferably 10 wt. % of the total weight of the $MoO_3@Al_2O_3$—MgO nanocomposite material.

In some embodiments, the $MoO_3@Al_2O_3$—MgO nanocomposite material has a hydrogen generation rate of greater than or equal to 400 milliliters per minute per gram ($mL \cdot min^{-1} \cdot g^{-1}$) when used to generate hydrogen from $NaBH_4$. In some embodiments, the $MoO_3@Al_2O_3$—MgO nanocomposite material has a hydrogen generation rate of greater than or equal to 500 $mL \cdot min^{-1} \cdot g^{-1}$, preferably 510 $mL \cdot min^{-1} \cdot g^{-1}$, preferably 520 $mL \cdot min^{-1} \cdot g^{-1}$, preferably 530 $mL \cdot min^{-1} \cdot g^{-1}$, preferably 540 $mL \cdot min^{-1} \cdot g^{-1}$, preferably 550 $mL \cdot min^{-1} \cdot g^{-1}$, preferably 560 $mL \cdot min^{-1} \cdot g^{-1}$, preferably 570 $mL \cdot min^{-1} \cdot g^{-1}$, and yet more preferably 580 $mL \cdot min^{-1} \cdot g^{-1}$ when used to generate hydrogen from $NaBH_4$ at a temperature of 30° C. In some embodiments, the $MoO_3@Al_2O_3$—MgO nanocomposite material has a hydrogen generation rate of greater than or equal to 550 $mL \cdot min^{-1} \cdot g^{-1}$ when used to generate hydrogen from $NaBH_4$ at a temperature of 30° C.

In some embodiments, the $MoO_3@Al_2O_3$—MgO nanocomposite material has a hydrogen generation rate of greater than or equal to 600 $mL \cdot min^{-1} \cdot g^{-1}$, preferably 610 $mL \cdot min^{-1} \cdot g^{-1}$, preferably 620 $mL \cdot min^{-1} \cdot g^{-1}$, and yet more preferably 630 $mL \cdot min^{-1} \cdot g^{-1}$ when used to generate hydrogen from $NaBH_4$ at a temperature of 35° C.

In some embodiments, the $MoO_3@Al_2O_3$—MgO nanocomposite material has a hydrogen generation rate of greater than or equal to 800 $mL \cdot min^{-1} \cdot g^{-1}$, preferably 810 $mL \cdot min^{-1} \cdot g^{-1}$, preferably 820 $mL \cdot min^{-1} \cdot g^{-1}$, preferably 830 $mL \cdot min^{-1} \cdot g^{-1}$, preferably 840 $mL \cdot min^{-1} \cdot g^{-1}$, preferably 850 $mL \cdot min^{-1} \cdot g^{-1}$, preferably 860 $mL \; min^{-1} \cdot g^{-1}$, preferably 870 $mL \cdot min^{-1} \cdot g^{-1}$, and preferably 880 $mL \cdot min^{-1} \cdot g^{-1}$, preferably 890 $mL \cdot min^{-1} \cdot g^{-1}$, preferably 900 $mL \cdot min^{-1} \cdot g^{-1}$, preferably 910 $mL \cdot min^{-1} \cdot g^{-1}$, preferably 920 $mL \cdot min^{-1} \cdot g^{-1}$, preferably 930 $mL \cdot min^{-1} \cdot g^{-1}$, and yet more preferably 940 $mL \cdot min^{-1} \cdot g^{-1}$, when used to generate hydrogen from $NaBH_4$ at a temperature of 40° C.

In some embodiments, the $MoO_3@Al_2O_3$—MgO nanocomposite material has a hydrogen generation rate of greater than or equal to 1000 $mL \cdot min^{-1} \cdot g^{-1}$ when used to generate hydrogen from $NaBH_4$ at a temperature of 45° C. In some embodiments, the $MoO_3@Al_2O_3$—MgO nanocomposite material has a hydrogen generation rate of greater than or equal to 1200 $mL \cdot min^{-1} \cdot g^{-1}$, preferably 1210 $mL \cdot min^{-1} \cdot g^{-1}$, preferably 1220 $mL \cdot min^{-1} \cdot g^{-1}$, preferably 1230 $mL \cdot min^{-1} \cdot g^{-1}$, preferably 1240 $mL \cdot min^{-1} \cdot g^{-1}$, preferably 1250 $mL \cdot min^{-1} \cdot g^{-1}$, preferably 1260 $mL \cdot min^{-1} \cdot g^{-1}$, preferably 1270 $mL \cdot min^{-1} \cdot g^{-1}$, and preferably 1280 $mL \cdot min^{-1} \cdot g^{-1}$, preferably 1290 $mL \cdot min^{-1} \cdot g^{-1}$, preferably 1300 $mL \cdot min^{-1} \cdot g^{-1}$, preferably 1310 $mL \cdot min^{-1} \cdot g^{-1}$, preferably 1320 $mL \cdot min^{-1} \cdot g^{-1}$, preferably 1330 $mL \cdot min^{-1} \cdot g^{-1}$, preferably 1340 $mL \cdot min^{-1} \cdot g^{-1}$, preferably 1350 $mL \cdot min^{-1} \cdot g^{-1}$, preferably 1360 $mL \cdot min^{-1} \cdot g^{-1}$, preferably 1370 $mL \cdot min^{-1} \cdot g^{-1}$, preferably 1380 $mL \cdot min^{-1} \cdot g^{-1}$, preferably 1390 $mL \cdot min^{-1} \cdot g^{-1}$, and yet more preferably 1400 $mL \cdot min^{-1} \cdot g^{-1}$ when used to generate hydrogen from $NaBH_4$ at a temperature of 45° C.

EXAMPLES

The following examples demonstrate a method for synthesis of a $MoO_3@Al_2O_3$—MgO nanocomposite material and a method for hydrogen generation by use thereof. The examples are provided solely for illustration and are not to be construed as limitations of the present disclosure, as many variations thereof are possible without departing from the spirit and scope of the present disclosure.

Example 1: Preparation of 10% $MoO_3@MgAl_2O_4$ Nanocomposite Material

According to the present disclosure, the 10% $MoO_3@MgAl_2O_4$ nanocomposite material was synthesized by mixing about 10.0 grams (g) of sucrose, 17.46 g of $Al(NO_3) \; 3.9H_2O$, and 25.41 g of $Mg(Ac)_2 \cdot 4H_2O$, in a 500 milliliter (mL) beaker. Further, ammonium molybdate and 30 mL distilled water (DW) were added to the powder mixture and heated to 100° C. till the contents of the beaker turned into a clear solution. Further, the temperature was raised to about 150° C. to 200° C. and heated until the sucrose was carbonized. The obtained black product was ground in a mortor, calcined at a temperature of about 750° C. for 3.0 hours, and the 10% $MoO_3@MgAl_2O_4$ nanocomposite material was collected. The 10% $MoO_3@MgAl_2O_4$ nanocomposite material may be referred to as 'catalyst', 'composite', or 'nanocomposite', hereinafter without any limitations.

Figure 2A:
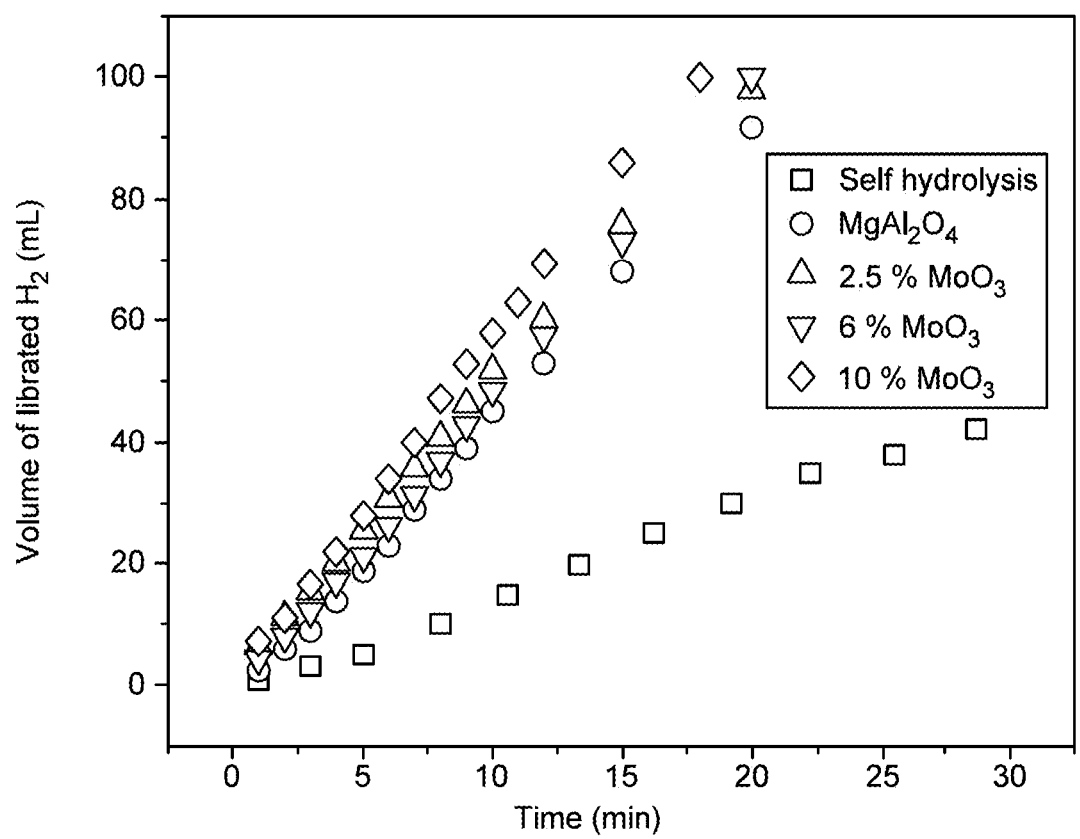
FIG. 2A is a graph depicting variation of volume of liberated hydrogen gas (H$_2$) with respect to reaction time, according to certain embodiments.
Figure 2B:
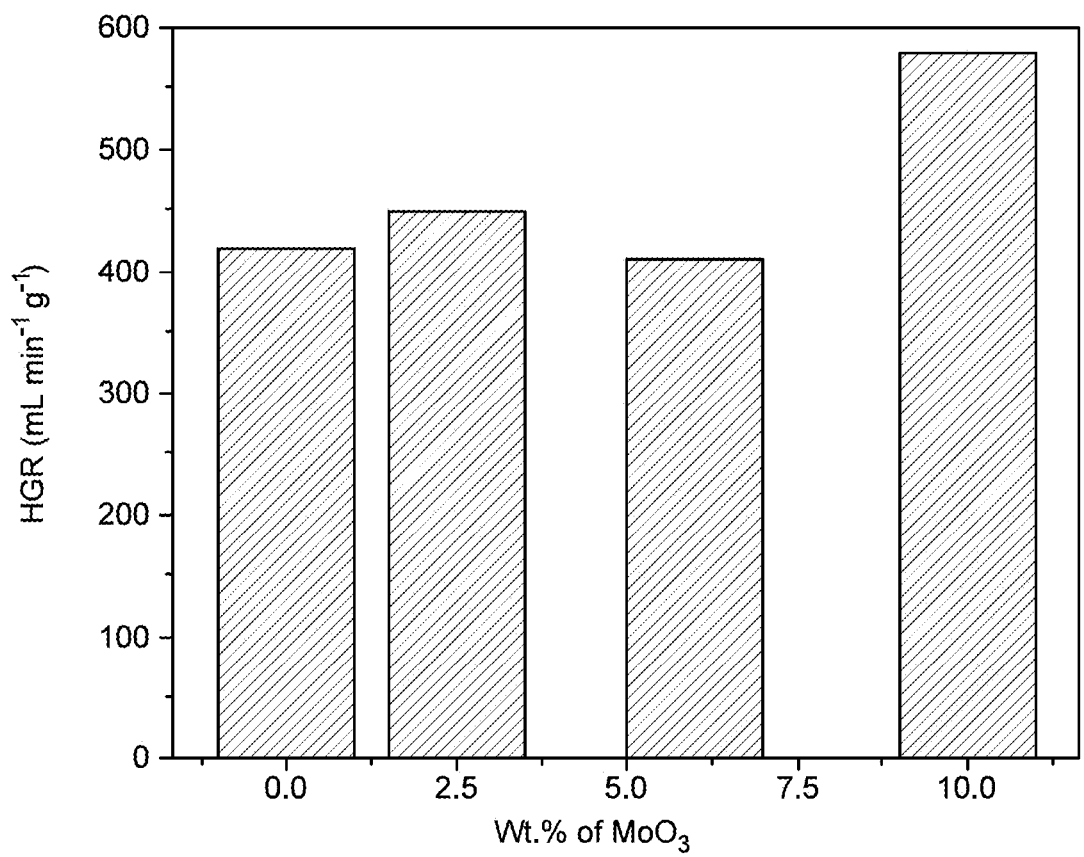
FIG. 2B is a graph depicting variation of hydrogen generation rate (HGR) with percent MoO$_3$, over pure MgAl$_2$O$_4$, and 2.5% to 10% MoO$_3$/MgAl$_2$O$_4$ catalyst calcined at 700° C., with a reaction temperature of about 30° C., according to certain embodiments.
Figure 3A:
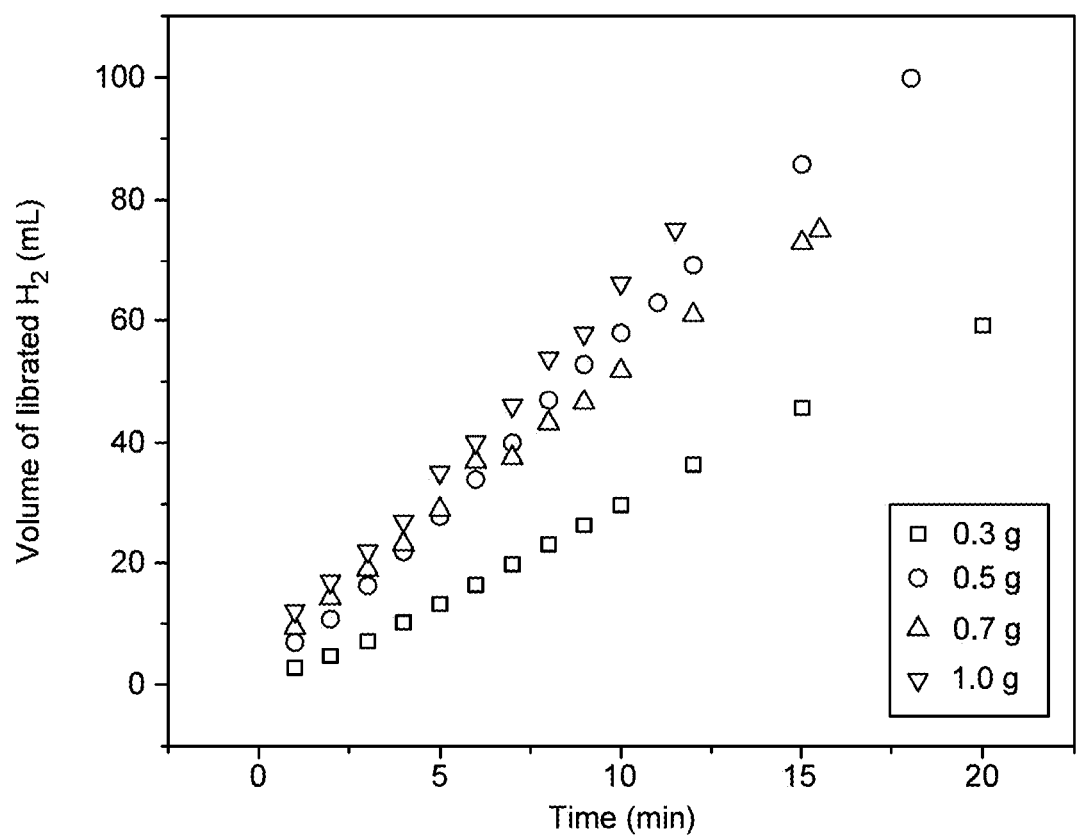
FIG. 3A is a graph depicting variation of volume of liberated H$_2$ with respect to reaction time, according to certain embodiments.
Figure 3B:
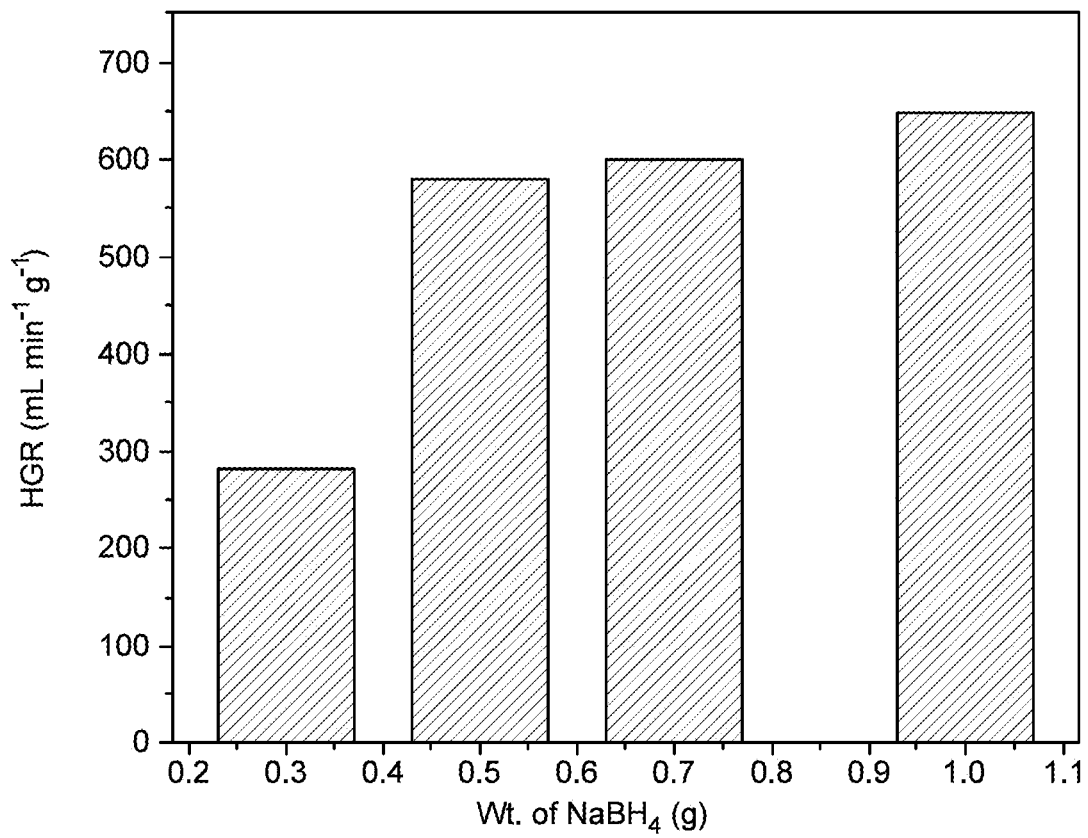
FIG. 3B is a graph depicting variation of HGR with weight of NaBH$_4$, over 10% MoO$_3$/MgAl$_2$O$_4$ nanocomposite catalyst, calcined at 700° C., according to certain embodiments.

According to the present disclosure, the 10% $MoO_3@MgAl_2O_4$ nanocomposite material was prepared as per the method described above. The nanocomposite material included low-cost materials, prepared through an efficient method. The solid catalyst efficiently hydrolyzed sodium borohydride (NaBH$_4$) into clean and pure hydrogen (H$_2$) within minutes at a high hydrogen generation rate (HGR). In general, NaBH$_4$ is a safe, stable, and lightweight hydrogen storage material, which may offer a high hydrogen storage capacity of about 10.8 weight percent. The hydrolysis results of NaBH$_4$ with and without the 2.5% to 10% MoO$_3$@MgAl$_2$O$_4$ nanocomposite material were evaluated and depicted in FIGS. 2A-2B. The catalytic action of the pure and loaded catalysts was observed and all catalysts exhibited a high catalytic activity, when compared to the self-hydrolysis process, as shown in FIG. 2A. Results indicated that the pure MgAl$_2$O$_4$ catalyst depicted lower catalytic activity than the MoO$_3$@MgAl$_2$O$_4$ nanocomposite. In addition, among all MoO$_3$ loaded catalysts (2.5 wt. % to 10 wt. %), the catalyst containing 10 wt. % MoO$_3$ was the most active, with an HGR of 580 mL min$^{-1}$ g$^{-1}$ at a temperature of about 30° C., as shown in FIG. 2B.

Figure 4A:
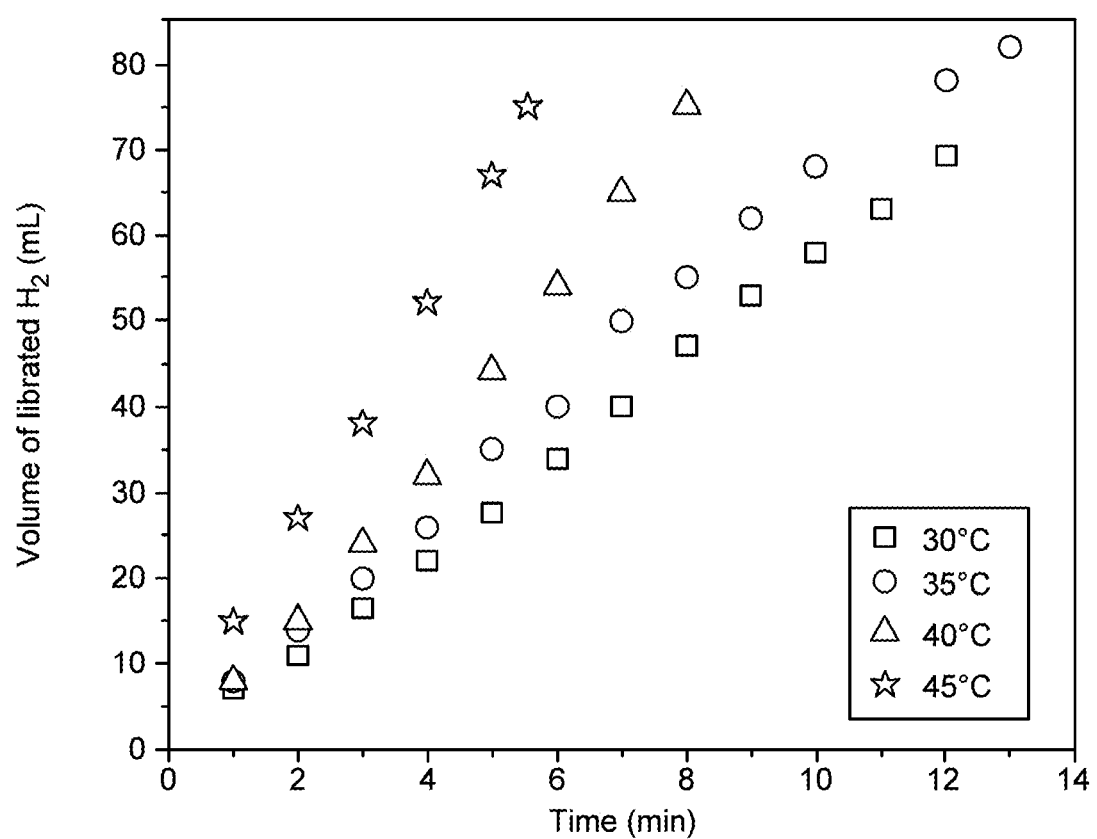
FIG. 4A is a graph depicting variation of volume of liberated H$_2$ with respect to reaction time, according to certain embodiments.
Figure 4B:
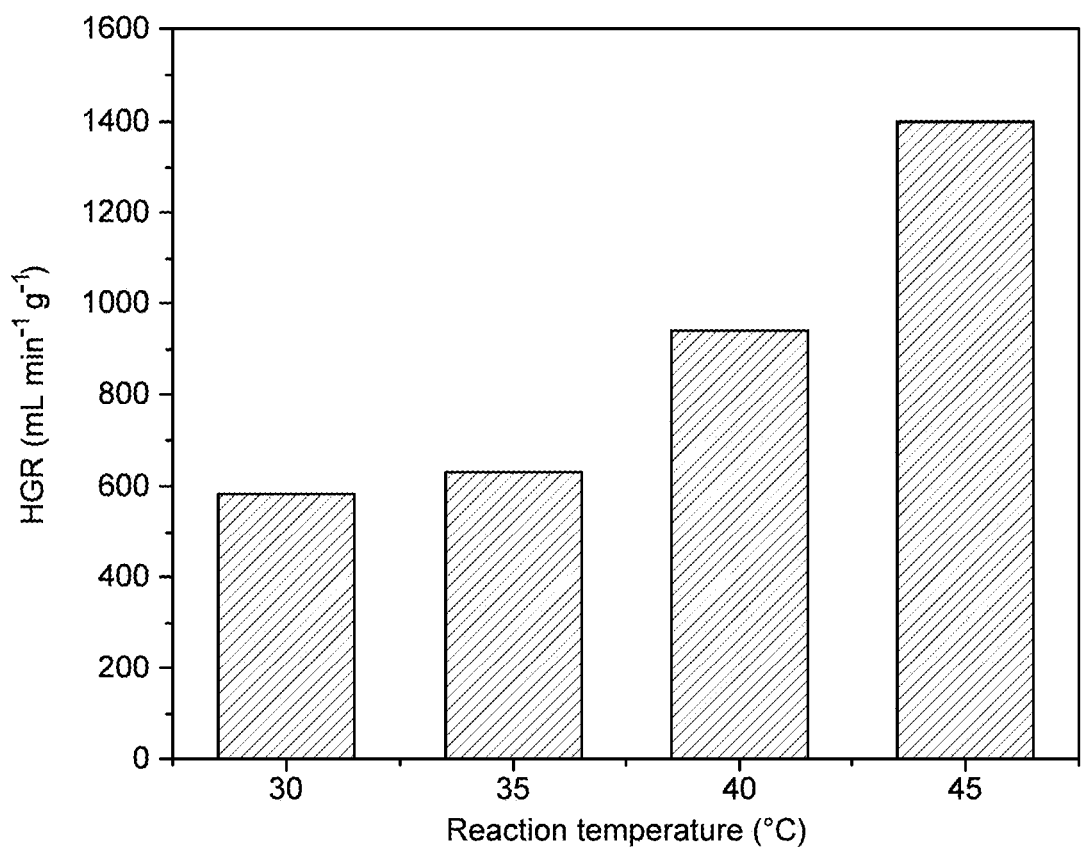
FIG. 4B is a graph depicting variation of HGR with reaction temperature, over 10% MoO$_3$/MgAl$_2$O$_4$ nanocomposite catalyst, according to certain embodiments.

The impact of weight of NaBH$_4$ and reaction temperature on the catalytic hydrolysis of NaBH$_4$ over 10% MoO$_3$@MgAl$_2$O$_4$ was analyzed, the results are depicted in FIGS. 3A-3B and FIGS. 4A-4B. Further, as can be seen from FIGS. 3A-3B, as the weight of NaBH$_4$ increases, the rate of hydrolysis increases, providing HGR values of about 280 mL min$^{-1}$ g$^{-1}$, 580 mL min$^{-1}$ g$^{-1}$, 600 mL min$^{-1}$ g$^{-1}$, and 650 mL min$^{-1}$ g$^{-1}$, corresponding to 0.3 g, 0.5 g, 0.7 g, and 1.0 g of NaBH$_4$, respectively. The aforementioned evaluations were conducted at a temperature of about 30° C. The influence of reaction temperature on the catalytic hydrolysis process was also examined at a temperature range of about 30° C. to 45° C., using 0.5 g of 10 wt. % MoO$_3$@MgAl$_2$O$_4$, as shown in FIGS. 4A-4B. The HGR values of 580 mL min$^{-1}$ g$^{-1}$, 630 mL min$^{-1}$ g$^{-1}$, 940 mL min$^{-1}$ g$^{-1}$, and 1400 mL min$^{-1}$ g$^{-1}$ were obtained at reaction temperatures of about 30° C., 35° C., 40° C., and 45° C., respectively. Activation energy for this reaction was also calculated to be about 43.7 kilojoules per mole (KJ/mol).

The aspects of the present disclosure provide a method of synthesis for the MoO$_3$@MgAl$_2$O$_4$ nanocomposite material and the use thereof in hydrogen generation. In particular, the MoO$_3$@MgAl$_2$O$_4$ nanocomposite material is prepared from low-cost using an efficient method. The nanocomposite as synthesized herein was able to hydrolyze the NaBH$_4$ into clean and pure hydrogen, within a few minutes and with a desirable hydrogen generation rate (HGR). The concentrations and strength of the MoO$_3$@MgAl$_2$O$_4$ nanocomposite material may be adjusted as per the requirements in a particular application. Production of the MoO$_3$@MgAl$_2$O$_4$ nanocomposite material is economically feasible and may provide enhancement in various fields where hydrogen is required, including clean and green energy applications. Further, the methods described herein and the synthesized MoO$_3$@MgAl$_2$O$_4$ nanocomposite material are environmentally friendly in nature and may provide sustainable energy development solutions.

Numerous modifications and variations of the present disclosure are possible in light of the above teachings. It is therefore to be understood that within the scope of the appended claims, the invention may be practiced otherwise than as specifically described herein.

The invention claimed is:

1. A method for synthesizing a MoO$_3$@Al$_2$O$_3$—MgO nanocomposite material, comprising:
adding distilled water and ammonium molybdate to a powder mixture of Al(NO$_3$)$_3$·9H$_2$O, Mg(Ac)$_2$·4H$_2$O, and sucrose to form a reaction mixture;
heating the reaction mixture to a reaction temperature in a range of 150° C. to 220° C. to form a carbonized product;
grinding the carbonized product to form a ground carbonized product; and
calcining the ground carbonized product at a temperature in a range of 700° C. to 800° C. for a period of 2 to 4 hours to form the MoO$_3$@Al$_2$O$_3$—MgO nanocomposite material,
wherein the MoO$_3$ content of the MoO$_3$@Al$_2$O$_3$—MgO nanocomposite material is in a range from 1 wt. % to 20 wt. % of the total weight of the MoO$_3$@Al$_2$O$_3$—MgO nanocomposite material, and
wherein the MoO$_3$@Al$_2$O$_3$—MgO nanocomposite material has a hydrogen generation rate of greater than or equal to 400 mL·min$^{-1}$·g$^{-1}$ when used to generate hydrogen from NaBH$_4$.

2. The method of claim 1, wherein the MoO$_3$ content of the MoO$_3$@Al$_2$O$_3$—MgO nanocomposite material is in a range from 5 wt. % to 15 wt. % of the total weight of the MoO$_3$@Al$_2$O$_3$—MgO nanocomposite material.

3. The method of claim 2, wherein the MoO$_3$ content of the MoO$_3$@Al$_2$O$_3$—MgO nanocomposite material is in a range from 8 wt. % to 12 wt. % of the total weight of the MoO$_3$@Al$_2$O$_3$—MgO nanocomposite material.

4. The method of claim 3, wherein the MoO$_3$ content of the MoO$_3$@Al$_2$O$_3$—MgO nanocomposite material is 10 wt. % of the total weight of the MoO$_3$@Al$_2$O$_3$—MgO nanocomposite material.

5. The method of claim 1, wherein the MoO$_3$@Al$_2$O$_3$—MgO nanocomposite material has a hydrogen generation rate of greater than or equal to 500 mL·min$^{-1}$·g$^{-1}$ when used to generate hydrogen from NaBH$_4$ at a temperature of 30° C.

6. The method of claim 5, wherein the MoO$_3$@Al$_2$O$_3$—MgO nanocomposite material has a hydrogen generation rate of greater than or equal to 550 mL·min$^{-1}$·g$^{-1}$ when used to generate hydrogen from NaBH$_4$ at a temperature of 30° C.

7. The method of claim 1, wherein the MoO$_3$@Al$_2$O$_3$—MgO nanocomposite material has a hydrogen generation rate of greater than or equal to 600 mL·min$^{-1}$·g$^{-1}$ when used to generate hydrogen from NaBH$_4$ at a temperature of 35° C.

8. The method of claim 1, wherein the MoO$_3$@Al$_2$O$_3$—MgO nanocomposite material has a hydrogen generation rate of greater than or equal to 800 mL·min$^{-1}$·g$^{-1}$ when used to generate hydrogen from NaBH$_4$ at a temperature of 40° C.

9. The method of claim 1, wherein the MoO$_3$@Al$_2$O$_3$—MgO nanocomposite material has a hydrogen generation rate of greater than or equal to 1000 mL·min$^{-1}$·g$^{-1}$ when used to generate hydrogen from NaBH$_4$ at a temperature of 45° C.

10. The method of claim 9, wherein the MoO$_3$@Al$_2$O$_3$—MgO nanocomposite material has a hydrogen generation rate of greater than or equal to 1200 mL·min$^{-1}$·g$^{-1}$ when used to generate hydrogen from NaBH$_4$ at a temperature of 45° C.

11. A method of hydrogen generation from NaBH$_4$, comprising:
hydrolyzing NaBH$_4$ in the presence of a MoO$_3$@Al$_2$O$_3$—MgO nanocomposite;

wherein the NaBH$_4$ is hydrolyzed to evolve H$_2$ gas and the MoO$_3$@Al$_2$O$_3$—MgO nanocomposite material catalyzes the hydrolysis; and collecting the H$_2$ gas;

wherein the MoO$_3$ content of the MoO$_3$@Al$_2$O$_3$—MgO nanocomposite material is in a range from 1 wt. % to 20 wt. % of the total weight of the MoO$_3$@Al$_2$O$_3$—MgO nanocomposite material, and wherein the hydrogen generation rate is greater than or equal to 400 mL·min$^{-1}$·g$^{-1}$.

12. The method of claim 11, wherein the MoO$_3$ content of the MoO$_3$@Al$_2$O$_3$—MgO nanocomposite material is in a range from 5 wt. % to 15 wt. % of the total weight of the MoO$_3$@Al$_2$O$_3$—MgO nanocomposite material.

13. The method of claim 12, wherein the MoO$_3$ content of the MoO$_3$@Al$_2$O$_3$—MgO nanocomposite material is in a range from 8 wt. % to 12 wt. % of the total weight of the MoO$_3$@Al$_2$O$_3$—MgO nanocomposite material.

14. The method of claim 13, wherein the MoO$_3$ content of the MoO$_3$@Al$_2$O$_3$—MgO nanocomposite material is 10 wt. % of the total weight of the MoO$_3$@Al$_2$O$_3$—MgO nanocomposite material.

15. The method of claim 11, wherein the hydrogen generation rate is greater than or equal to 500 mL·min$^{-1}$·g$^{-1}$ at a reaction temperature of 30° C.

16. The method of claim 15, wherein the hydrogen generation rate is greater than or equal to 550 mL·min$^{-1}$·g$^{-1}$ at a reaction temperature of 30° C.

17. The method of claim 11, wherein the hydrogen generation rate is greater than or equal to 600 mL·min$^{-1}$·g$^{-1}$ at a reaction temperature of 35° C.

18. The method of claim 11, wherein the hydrogen generation rate is greater than or equal to 800 mL·min$^{-1}$·g$^{-1}$ at a reaction temperature of 40° C.

19. The method of claim 11, wherein the hydrogen generation rate is greater than or equal to 1000 mL·min$^{-1}$·g$^{-1}$ at a reaction temperature of 45° C.

20. The method of claim 19, wherein the hydrogen generation rate is greater than or equal to 1200 mL·min$^{-1}$·g$^{-1}$ at a reaction temperature of 45° C.

* * * * *